(12) United States Patent
Sun et al.

(10) Patent No.: US 8,599,810 B2
(45) Date of Patent: Dec. 3, 2013

(54) METHOD, EQUIPMENT AND SYSTEM FOR IMPLEMENTING COORDINATED MULTI-POINT TRANSMISSION

(75) Inventors: Guolin Sun, Kista (SE); Feng Ye, Chengdu (CN); Xiujuan Gao, Chungdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 13/338,358

(22) Filed: Dec. 28, 2011

(65) Prior Publication Data

US 2012/0093143 A1      Apr. 19, 2012

Related U.S. Application Data

(63) Continuation of application No. PCT/CN2010/078713, filed on Nov. 15, 2010.

(30) Foreign Application Priority Data

Dec. 31, 2009  (CN) .......................... 2009 1 0260758

(51) Int. Cl.
*H04W 4/00* (2009.01)
*H04J 3/16* (2006.01)
*H04B 3/10* (2006.01)

(52) U.S. Cl.
USPC ............ 370/338; 370/465; 370/491; 370/500

(58) Field of Classification Search
USPC .......... 370/328, 330, 338, 339, 465, 491, 500
See application file for complete search history.

(56) References Cited

U.S. PATENT DOCUMENTS

2005/0078649 A1    4/2005   Tehrani et al.
2005/0169396 A1    8/2005   Baier et al.
(Continued)

FOREIGN PATENT DOCUMENTS

CN    101453438 A    6/2009
CN    101483873 A    7/2009
(Continued)

OTHER PUBLICATIONS

Guolin Sun and Feng Ye; A FFT-window search algorithm for diversity combining in downlink multipoint joint transmission; IEEE 978-1-4244-5849; Mar. 2010 (5 pages).*

(Continued)

*Primary Examiner* — Noel Beharry
*Assistant Examiner* — Joe Combs
(74) *Attorney, Agent, or Firm* — Conley Rose, P.C.; Grant Rodolph; Nicholas K. Beaulieu

(57) ABSTRACT

A method, equipment and system for implementing coordinated multi-point transmission are provided for resolving the problem that there exists phase noise in the signals received by a User Equipment (UE) end in coordinated multi-point transmission. The method for implementing coordinated multi-point transmission includes: obtaining phase differences between the current service cell and other coordinated cells by calculating channel cross-covariance matrixes between the current service cell and other coordinated cells in a coordinated multi-point transmission system (101); feeding back the phase differences corresponding to the base stations of said other coordinated cells respectively to the base stations of said other coordinated cells, in order to implement phase compensation (102); receiving the signals transmitted after the phase compensation by base stations of all the coordinated cells (103). The method, terminal and system provided by the embodiments of the present invention are applicable to the coordinated communication in various wireless networks.

20 Claims, 4 Drawing Sheets

(56) References Cited

U.S. PATENT DOCUMENTS

| | | | |
|---|---|---|---|
| 2008/0130674 A1* | 6/2008 | Ahmed-Ouameur et al. | 370/441 |
| 2009/0122853 A1* | 5/2009 | Lopez de Victoria | 375/232 |
| 2009/0257533 A1* | 10/2009 | Lindoff et al. | 375/344 |
| 2010/0033374 A1* | 2/2010 | van Rensburg et al. | 342/368 |
| 2010/0172340 A1* | 7/2010 | Muharemovic et al. | 370/350 |
| 2010/0197260 A1* | 8/2010 | Chappaz | 455/226.2 |
| 2010/0234053 A1* | 9/2010 | Zangi et al. | 455/501 |
| 2010/0238984 A1* | 9/2010 | Sayana et al. | 375/219 |
| 2010/0271931 A1* | 10/2010 | Cheng et al. | 370/210 |
| 2010/0272218 A1* | 10/2010 | Yeh et al. | 375/330 |
| 2010/0322171 A1* | 12/2010 | Dekorsy et al. | 370/329 |
| 2011/0085610 A1* | 4/2011 | Zhuang et al. | 375/260 |
| 2011/0105051 A1* | 5/2011 | Thomas et al. | 455/69 |
| 2011/0164691 A1* | 7/2011 | Thomas et al. | 375/259 |
| 2011/0237270 A1* | 9/2011 | Noh et al. | 455/450 |
| 2011/0249767 A1* | 10/2011 | Chen et al. | 375/295 |
| 2011/0300819 A1* | 12/2011 | Nordstrom et al. | 455/130 |
| 2012/0027048 A1* | 2/2012 | Lindoff et al. | 375/140 |

FOREIGN PATENT DOCUMENTS

| | | |
|---|---|---|
| CN | 101494491 A | 7/2009 |
| EP | 1533968 A2 | 5/2005 |
| EP | 2 017 973 A1 | 1/2009 |
| WO | WO2009026400 A1 | 2/2009 |
| WO | WO2010072019 A1 | 1/2010 |
| WO | WO2011079655 A1 | 7/2011 |

OTHER PUBLICATIONS

3GPP TSG RAN WG1 Meeting #56, R1-090882, "Per-cell precoding methods for downlink joint processing CoMP," ETRI, Athens, Greece, Feb. 2009.

International Search Report for International Application No. PCT/CN2010078713, mailed Jan. 20, 2011 Huawei Technologies Co., LTD.

Foreign Communication From a Counterpart Application, Chinese Application 200910260758.8, Chinese Office Action dated Nov. 27, 2012, 9 pages.

Foreign Communication From a Counterpart Application, Chinese Application 200910260758.8, Partial English Translation of Chinese Office Action dated Nov. 27, 2012, 12 pages.

Foreign Communication from a Counterpart Application, PCT Application PCT/CN2010/078713, English Translation Written Opinion, dated Jan. 20, 2011, 4 pages.

3GPP TSG RAN WG1 meeting #56 (R1-090942); Feb. 9-13, 2009, Athens, Greece; Source: CATT; Title: Aspects of Joint Processing for Downlink CoMP; Agenda Item: 12.2; Document for: Discussion/Decision (10 pgs.).

3GPP TSG-RAN1 #57 (R1-091956); May 4-8, 2009, San Francisco, CA; Agenda Item: 15.2; Source: Fujitsu; Title: Pseudo Transmission Timing Control using Cyclic Shift for Downlink CoMP Joint Transmission; Document for: Discussion and Decision (8 pgs.).

3GPP TSG RAN WG1 Meeting #58bis (R1-094314); Oct. 12-16, 2009, Miyazaki, Japan; Source: ETRI; Title: UE feedback for downlink CoMP; Agenda Item: 7.5; Document for: Discussion/Decision (6 pgs.).

Koivisto, Tommi et al.; Impact of time and frequency offsets on cooperative multi-user MIMO-OFDM systems; IEEE 978-1-4244-5213; Apr. 2009 (5 pgs.).

Sun, Guolin et al.; A FFT-window search algorithm for diversity combining in downlink multipoint joint transmission; Huawei Tech Co. Ltd., IEEE 978-1-4244-5849; Mar. 2010 (5 pgs.).

Extended European Search Report relating to Application No. 10840444.3-1237 (PCT/CN2010078713), pursuant to Rule 62 EPC, a supplementary European search report (Art. 153(7) EPC) and the European search opinion for Huawei Technologies Co., Ltd.; mailed Mar. 6, 2012 (12 pgs.).

\* cited by examiner

METHOD, EQUIPMENT AND SYSTEM FOR IMPLEMENTING COORDINATED MULTI-POINT TRANSMISSION

CROSS-REFERENCE TO RELATED APPLICATIONS

This application is a continuation of International Application No. PCT/CN2010/078713, filed on Nov. 15, 2010, which claims priority to Chinese Patent Application No. 200910260758.8, filed with the Chinese Patent Office on Dec. 31, 2009, which is incorporated herein by reference in their entireties.

FIELD OF THE INVENTION

The present invention relates to the wireless communication technology, and particularly to a method, equipment and system for implementing coordinated multi-point transmission.

BACKGROUND OF THE INVENTION

In order to improve the Signal-to-Interference-and-Noise Ratio (SINR) of received signals of User Equipments (UEs) at the edges of a cell, a Coordinated Multi-point Process (CoMP), in which multiple base stations provide a coordinated transmission service to one UE simultaneously, is introduced into a LTE-A (Long Term Evolution—Advanced) system, thereby forming an architecture with distributed multiple antennae, which can greatly improve the frequency spectrum efficiency of users at the edges of a cell.

However, compared with a single-cell transmission, a downstream coordinated multi-point transmission has the following problems:

In a coordinated multi-point transmission, signals transmitted by different base stations will have some phase differences when they arrive at a UE, while the UE can generally maintain time-frequency synchronization only with the current service base station. Since it is difficult to maintain synchronization with all the coordinated base stations, the signals will generally have phase noises when a UE end combines the received signals.

SUMMARY OF THE INVENTION

A method, an equipment and a system for implementing coordinated multi-point transmission are provided by the embodiments of the present invention, resolving the problem that there exists phase noise in the signals received by a User Equipment (UE) end in coordinated multi-point transmission.

The embodiments of the present invention adopt the following technical solutions.

A method for implementing coordinated multi-point transmission comprises:

obtaining phase differences between other coordinated cells and a current service cell by calculating channel cross-covariance matrixes between the current service cell and the other coordinated cells;

feeding back the phase differences to corresponding base stations of the other coordinated cells, respectively, to implement phase compensation;

receiving signals transmitted by the base stations of the coordinated cells after the phase compensation, wherein the other coordinated cells are cells among all the coordinated cells other than the current service cell; the channel cross-covariance matrixes between the current service cell and the other coordinated cells are covariance matrixes between channel coefficients of the current service cell and the other coordinated cells.

A user equipment comprises:

a phase calculating unit, for obtaining phase differences between other coordinated cells and a current service cell by calculating channel cross-covariance matrixes between the current service cell and the other coordinated cells;

a feedback unit, for feeding back the phase differences to corresponding base stations of the other coordinated cells, respectively, to implement phase compensation;

a receiving unit, for receiving signals transmitted by the base stations of the coordinated cells after the phase compensation, wherein the other coordinated cells are cells among all the coordinated cells other than the current service cell; the channel cross-covariance matrixes between the current service cell and the other coordinated cells are covariance matrixes between channel coefficients of the current service cell and the other coordinated cells.

A system for implementing coordinated multi-point transmission comprises a user equipment and at least two base stations, wherein the at least two base stations belong to at least two coordinated cells in the mode of coordinated multi-point transmission, respectively, wherein the at least two base stations are configured to transmit pilot signals outwards;

the user equipment is configured to detect the pilot signals corresponding to the at least two base stations, respectively, obtain phase differences between other coordinated cells among the at least two coordinated cells and a current service cell by calculating channel cross-covariance matrixes between the current service cell and the other coordinated cells, and feed back the phase differences to the at least two base stations, in order to implement phase compensation;

the at least two base stations are further configured to implement a phase compensation of signals according to the phase differences fed back by the user equipment, and transmit the signals after the phase compensation at least to the user equipment.

In the method, equipment and system for implementing coordinated multi-point transmission provided by the embodiments of the present invention, the phase differences between other coordinated cells and a current service cell are easily obtained by establishing cross-covariance matrixes between the coefficients of the current service cell and the other coordinated cells; and the demodulation performance of signals of a user equipment is improved by feeding back the phase differences to the corresponding base stations by means of limited feedback in order to implement phase compensation of signals at transmitting ends, thereby effectively eliminating the influence on the receiving-transmitting synchronization by the phase noise caused by the phase differences among multiple coordinated cells.

DETAILED DESCRIPTION OF THE EMBODIMENTS

A method, equipment and system for implementing coordinated multi-point transmission provided by the embodiments of the present invention are described in detail with reference to the drawings.

Figure 1:
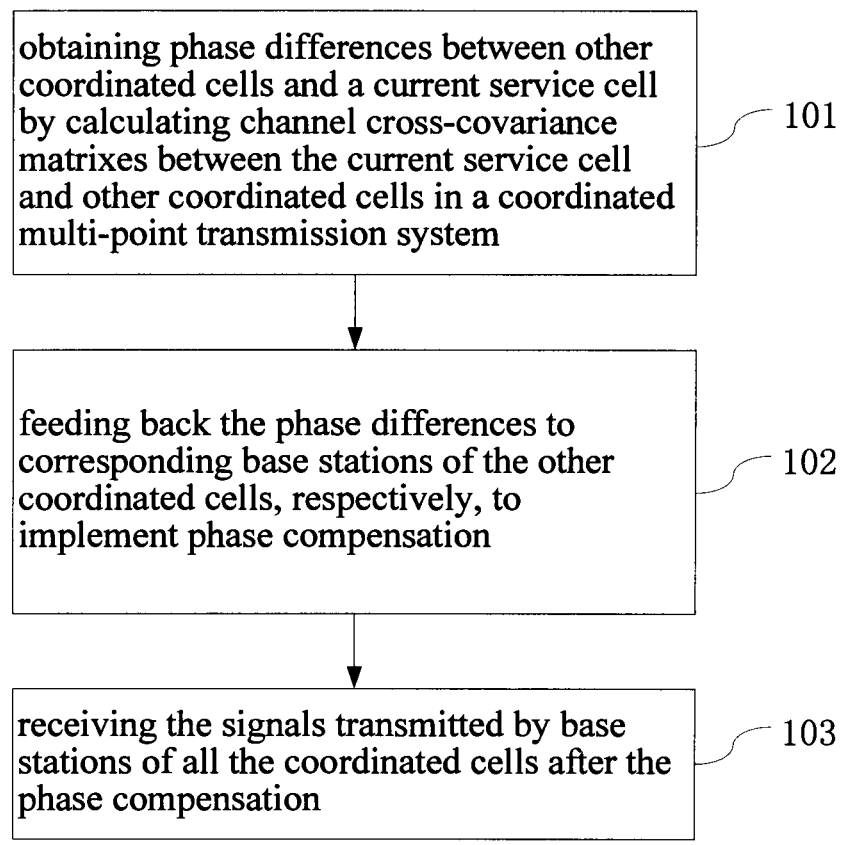
FIG. 1 is a flow chart of a method provided in a first embodiment of the present invention.

First Embodiment:

As shown in FIG. 1, a method for implementing coordinated multi-point transmission provided by the present embodiment includes the following steps:

101. Obtaining phase differences between other coordinated cells and a current service cell by calculating channel cross-covariance matrixes between the current service cell and the other coordinated cells in a coordinated multi-point transmission system.

Wherein the other coordinated cells are cells among all the coordinated cells in a coordinated multi-point transmission mode other than the current service cell. In a common situation, when an equipment feeds back the phase differences to a transmitting end, a phase reference cell will be determined first; and in the present embodiment, the current service cell in the coordinated multi-point transmission mode is taken as the phase reference cell.

Here, the cross-covariance matrixes between different coordinated cells can be constructed by means of the channel coefficients H (f) of different coordinated cells and the current service cell.

102. Feeding back the phase differences to corresponding base stations of the other coordinated cells, respectively, to implement phase compensation.

Obviously, it is also permitted to feed back a PMI (Preferred Matrix Index) corresponding to the base stations of the other coordinated cells respectively to the base stations of the other coordinated cells; since the PMI is a serial number of a code in a corresponding code table after phase difference quantization, the phase difference corresponding to a PMI will be obtained if the PMI is gotten.

103. Receiving signals transmitted by the base stations of all the coordinated cells after the phase compensation.

In the description of the above method, the subject performing the respective steps may be some user equipment in the coordinated multi-point transmission system.

Figure 2:
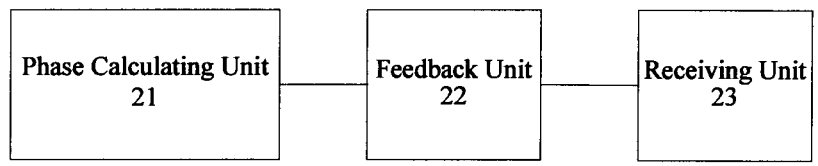
FIG. 2 is a schematic structure diagram of a user equipment provided in the first embodiment of the present invention.

In order to carry out the above method in a better way, a user equipment for implementing coordinated multi-point transmission is also provided in the present embodiment, and as shown in FIG. 2, it includes:

a phase calculating unit 21, for obtaining phase differences between other coordinated cells and a current service cell by calculating channel cross-covariance matrixes between the current service cell and the other coordinated cells in a coordinated multi-point transmission system;

a feedback unit 22, for feeding back the phase differences to corresponding base stations of the other coordinated cells, respectively, to implement phase compensation;

a receiving unit 23, for receiving signals transmitted by the base stations of the coordinated cells after the phase compensation, wherein the other coordinated cells are cells among all the coordinated cells other than the current service cell; the channel cross-covariance matrixes between the current service cell and the other coordinated cells are the covariance matrixes between channel coefficients of the current service cell and the other coordinated cells.

In the method and equipment for implementing coordinated multi-point transmission provided by the embodiments of the present invention, the phase differences between other coordinated cells and a current service cell are easily obtained by establishing cross-covariance matrixes between the coefficients of the current service cell and the other coordinated cells; and the demodulation performance of signals of a user equipment is improved by feeding back the phase differences to the corresponding base stations by means of limited feedback in order to implement phase compensation of signals at transmitting ends, thereby effectively eliminating the influence on the receiving-transmitting synchronization by the phase noise caused by the phase differences among multiple coordinated cells.

Second Embodiment:

The method for implementing coordinated multi-point transmission provided in an embodiment of the present invention will be described below in detail with reference to a specific embodiment.

First, a scenario as below is assumed: the antenna configuration for each cell is 4-transmitting and 2-receiving, and a UE starts a CoMP coordinated transmission mode by means of a cell wireless scenario analysis; wherein, the original signal sent by a cell to the UE side is s(t), an expression in a time domain of a channel coefficient between a cell and a UE is h (t), and the corresponding expression in a frequency domain thereof is H(f); h(t) or H(f) herein can be obtained by channel estimation.

Figure 3:
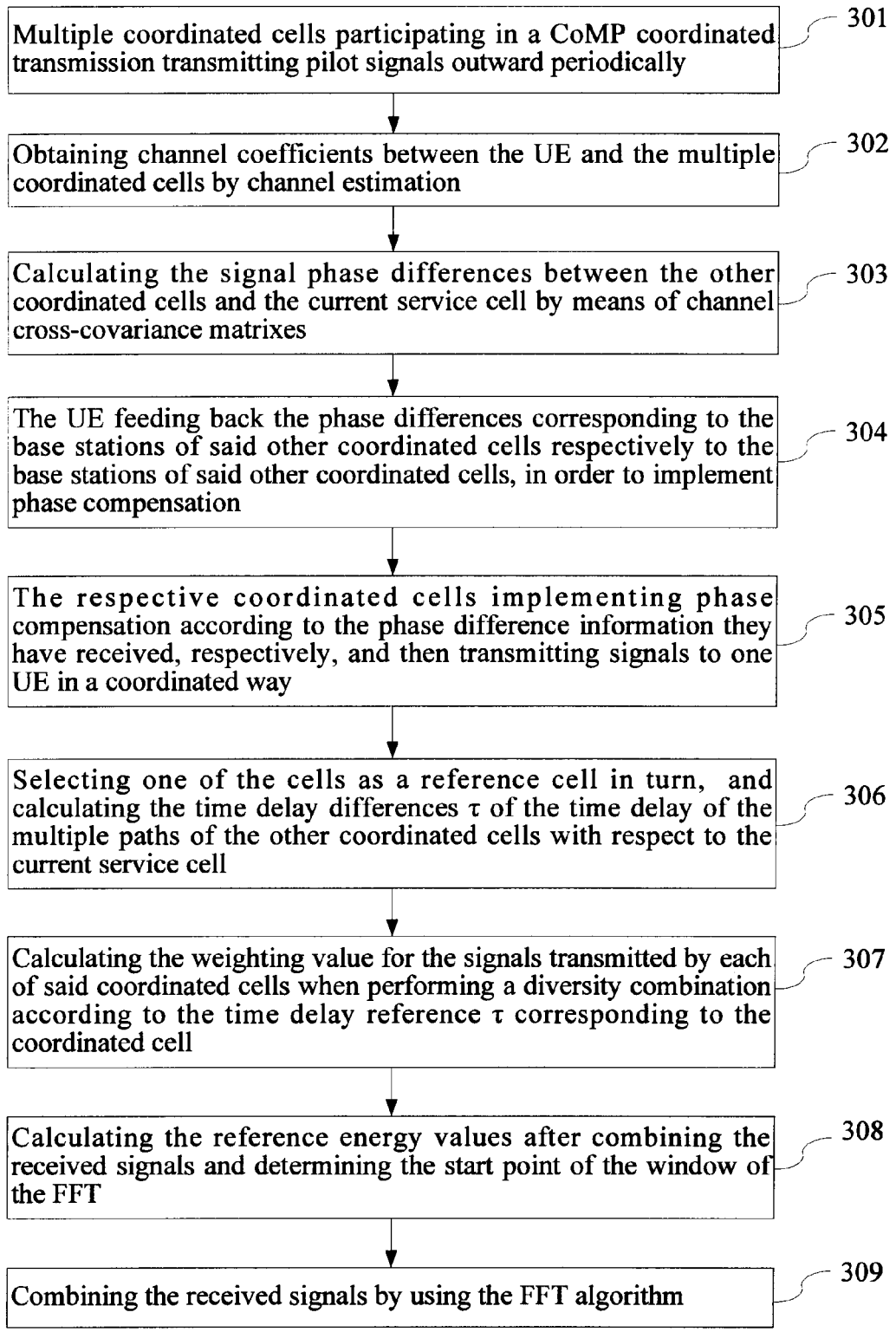
FIG. 3 is a flow chart of a method provided in a second embodiment of the present invention.

As shown in FIG. 3, the method for implementing coordinated multi-point transmission provided in the present embodiment specifically comprises the following steps:

301. Multiple coordinated cells participated in a CoMP coordinated transmission transmit pilot signals outwards periodically.

302. A UE obtains channel coefficients H (f) between the UE and the multiple coordinated cells by channel estimation, after detecting and receiving the pilot signals transmitted by the multiple coordinated cells.

303. The signal phase differences between the current service cell and the other coordinated cells are calculated by means of channel cross-covariance matrixes; and the other coordinated cells herein refer to the coordinated cells other than the current service cell among all the coordinated cells in the CoMP transmission mode. Specifically, If the channel coefficient of the current service cell is $H_x(f)$ and the channel coefficient of a coordinated cell among the other coordinated cells is $H_y(f)$, then the channel cross-covariance matrix between the current service cell and the cell among the coordinated cells is:

$$R_{xy}(f) = H_x(f)^H H_y(f) = \begin{bmatrix} R_{11} & R_{12} & R_{13} & R_{14} \\ R_{21} & R_{22} & R_{23} & R_{24} \\ R_{31} & R_{32} & R_{33} & R_{34} \\ R_{41} & R_{42} & R_{43} & R_{44} \end{bmatrix} \quad \text{Formula 1}$$

Wherein $H_x(f)^H$ is the transposition of $H_x(f)$; the calculated arguments of elements $R_{11}$, $R_{22}$, $R_{33}$ and $R_{44}$ on the main diagonal of $R_{xy}(f)$ are the phase differences of the signals transmitted by 4 antennae of the cell among the other coordinated cells with respect to the current service cell.

In order to maintain a relatively stable pre-estimation and feedback, the above cross-covariance matrix can be updated continuously by using a sliding averaging way:

$$R_{xy}^{(k+1)} \overset{k+1}{\longleftarrow} \rho R_{xy}^{(k)} + (1-\rho) \sum_{n=1}^{N_d} H_{x,n}^{(k),H} H_{y,n}^{(k)} \qquad \text{Formula 2}$$

That is, $$\rho R^{(k)} + (1-\rho) \sum_{n=1}^{N_d} H_n^{(k),H} H_n^{(k)}$$

is calculated according to a channel cross-covariance matrix $R_{xy}^{(k)}$ at time k and a channel coefficient vector $H^{(k)}$ at time k, and the calculation result is taken as the channel cross-covariance matrix $R_{xy}^{(k+1)}$ at time k+1, wherein, $N_d$ is the window size of a Fast Fourier Transform when the UE performs the diversity combination; $\rho$ is a set weighing value; k denotes time k, and the sum of $R_{xy}^{(k)}$ at time k and current $N_d$ channel cross-covariance matrixes are weight-averaged so that $R_{xy}^{(k+1)}$ at time k+1 can be obtained.

304. The UE feeds back the phase differences to corresponding base stations of the other coordinated cells, respectively, to implement phase compensation.

305. The respective coordinated cells implement the phase compensation according to the phase difference information they have received, respectively, and then all the coordinated cell transmit signals to one UE in a coordinated way.

306. After the UE receives the signals transmitted by the multiple coordinated cells, it selects one of them as a reference cell in turn, takes the k-th path from the reference cell to the UE as a reference path, takes the time delay of the reference cell with respect to the current service cell as a reference time delay, and calculates the time delay differences τ of the time delay of the paths to the UE of the other coordinated cells with respect to the reference time delay (i.e. with respect to the current service cell).

307. A weighting value for the signals transmitted by each of said coordinated cells when performing a diversity combination at the UE end is calculated according to the time delay reference τ corresponding to the coordinated cell; and specifically, the weighting value can be calculated by the following formula 3:

$$c(\tau) = \begin{cases} 0 & \tau < -T_u & (1) \\ \dfrac{T_u + \tau}{T_u} & -T_u < \tau < 0 & (2) \\ 1 & 0 < \tau < T_{CP} & (3) \\ \dfrac{\tau - T_{CP}}{T_u} & T_{CP} < \tau < T_{CP} + T_u & (4) \\ 0 & T_{CP} + T_u < \tau & (5) \end{cases} \qquad \text{Formula 3}$$

Wherein, $T_u$ is the width of an OFDM (Orthogonal Frequency Division Multiplexing) symbol, which does not include a Cyclic Preamble (CP); and $T_{CP}$ is the length of the Cyclic Preamble. Actually, the weighting value calculated according to the time delay difference corresponding to each coordinated cell is an effective proportion of the other multiple paths (including all the coordinated cell signals) received in the window calculated by using FFT (Fast Fourier Transform) when performing the diversity combination at the UE end.

In the above Formula 3, Situation (1) denotes that the path arrives at the UE prior to the reference path, i.e. the time delay difference is less than 0, and the difference exceeds one OFDM symbol width; Situation (2) denotes that the path arrives at the UE prior to the reference path, but the difference does not exceed one OFDM symbol width; Situation (3) denotes that the path arrives at the UE behind the reference path, i.e. the time delay difference is larger than 0, but the difference does not exceed the CP width; Situation (4) denotes that the path arrives at the UE behind the reference path, and the difference exceeds the CP width but is less than the whole symbol width (including the CP); and Situation (5) denotes that the path arrives at the UE behind the reference path, and the time delay difference exceeds the whole symbol width (including the CP).

308. The reference energy values after combining the received signals are calculated according to the weighting value corresponding to each coordinated cell, and the reference cell corresponding to the maximum value of the reference energy values is determining as a first cell, wherein the time start point after removing the Cyclic Preamble of the signals of said first cell is the start point of the window of the FFT.

Specifically, the energy after diversity combining the multi-path signals received by the UE is:

$$P = \sum_{n=1}^{N} \sum_{l=1}^{L} c^2(\tau_{n,l} - \tau_{i,k}) |h_{n,l}|^2 \qquad \text{Formula 4}$$

Wherein, N is the number of the coordinated cells, L is the number of multiple paths of each cell signal to the UE (assuming the number of multiple paths of each cell signal to the UE is the same), $\tau_{n,l}$ is the time delay of the l-th path of the cell n to the UE, and $\tau_{i,k}$ is the channel time-domain impulse response of the k-th path of the cell i to the UE.

Then, the time delay of the reference cell, which can maximize the energy after the diversity combination, with respect to the current service cell should be $$\tau_u^{syn}(i, k) = \underset{i,k}{\operatorname{argmax}} \sum_{n=1}^{N} \sum_{l=1}^{L} c^2(\tau_{n,l} - \tau_{i,k}) |h_{n,l}|^2 \qquad \text{Formula 5}$$

In the present embodiment, the above Formula 5 can further be reduced; and assuming that there is a fixed time delay difference between the signals from any two cells to the UE, and the time delay differences existing among different multiple paths of one same cell are ignored, $\tau_{n,l}$ in the above Formula 5 satisfies $\tau_{n,1} = \tau_{n,2} = \ldots = \tau_{n,l}$, and thus Formula 5 can be reduced as:

$$\tau_u^{syn}(i) = \underset{i}{\operatorname{argmax}} \sum_{n=1}^{N} \sum_{l=1}^{L} c^2(\tau_{n,1} - \tau_{i,1}) |h_{n,l}|^2 \qquad \text{Formula 6}$$

That is, only the $1^{st}$ path among the multiple paths from each coordinated cell to the UE is used as a reference for the optimum window selection, so as to reduce the search time.

The time delay difference that can maximize the signal-combination energy can be obtained according to Formula 6, the reference cell corresponding to the maximum time delay difference is taken as the first cell, and the time start point after removing the Cyclic Preamble of the signals of the first cell is the start point of the window of the FFT.

309. The received signals are combined by using the FFT algorithm, according to the determined start point of the window of the FFT.

Specifically, at a sub-carrier k, the frequency-domain channel coefficient from the transmitter of the n-th cell to the UE end can be expressed as:

$$H_n(f_k) = FFT(h_n(t)) = \sum_{l=1}^{L} h_{n,l} \cdot e^{-j2\pi f_k \tau_{n,l}} \quad \text{Formula 7}$$

$$n = 1, 2, \ldots N,$$
$$k = 0, 1, 2, \ldots K$$

Wherein, L is the number of multi-path sub-channels, kW is the channel time-domain impulse response, $h_{n,l}$ is the time-domain impulse response of the l-th sub-path, $\tau_{n,l}$ is the time delay of the l-th sub-path with respect to the first path. For example, the frequency channel coefficients from the 1$^{st}$ cell and the 2$^{nd}$ cell to the current UE are:

$$H_1(f_k) = \sum_{l=1}^{L} h_{1,l} \cdot e^{-j2\pi f_k \tau_{1,l}} \quad k = 0, 1, 2, \ldots K$$

$$H_2(f_k) = \sum_{l=1}^{L} h_{2,l} \cdot e^{-j2\pi f_k \tau_{2,l}} \quad k = 0, 1, 2, \ldots K$$

Since the distance between the 1$^{st}$ cell and the UE and the distance between the 2$^{nd}$ cell and the UE are different, the times when the signals arrive at the UE are also different, and there exists a certain relative time delay. If the time start point after removing the CP of the signal from the 1$^{st}$ cell to the UE is taken as the start point of the window of the receiver FFT, and the time difference between the time when the 2$^{nd}$ cell signal arrives at the UE and the time when the 1$^{st}$ signal arrives at the UE (the 1$^{st}$ path time difference) is defined as $\Delta_{\tau2,1}$, then when performing signal combination, the frequency-domain channel coefficient $H'_2(f_k)$ between the 2$^{nd}$ cell and the UE can be equivalent as:

$$H'_2(f_k) = FFT(h_2(t - \Delta\tau_{2,1})) \quad \text{Formula 8}$$

$$= \sum_{l=1}^{L} h_{2,l} \cdot e^{-j2\pi f_k \tau_{2,l}} \cdot e^{-j2\pi f_k \Delta\tau_{2,1}}$$

$$= H_2(f_k) \cdot e^{-j2\pi f_k \Delta\tau_{2,1}}$$

and then the final equivalent combination channel coefficient is:

$$H(f_k) = H_1(f_k) + H'_2(f_k) = H_1(f_k) + H_2(f_k) \cdot e^{-j2\pi f_k \Delta\tau_{2,1}} \quad \text{Formula 9}$$

If the number of the coordinated cells is extended to M, and the FFT window of the 1$^{st}$ coordinated cell is still taken as the combined FFT window, the combined channel coefficient can be expressed as:

$$H(f_k) = \sum_{m=1}^{M} H_m(f_k) \cdot e^{-j2\pi f_k \Delta\tau_{m,1}} \quad \text{Formula 10}$$

In Formula 10, the time start point after removing the CP of the signal of the 1$^{st}$ cell that is determined in the step 308 is taken as the window start point of the FFT, and $\Delta\tau_{m,1}$ is the time delay of the m-th coordinated cell with respect to the first cell, i.e. the time delay of the m-th coordinated cell with respect to said phase reference cell.

Then, the combined signal is calculated according to the calculated channel coefficient $H(f_k)$ after the combination.

Furthermore, in the present embodiment, the signal powers of signals transmitted by a coordinated cell can further be calculated by calculating the channel auto-covariance matrix of said coordinated cell; more specifically, If the channel coefficient of said coordinated cell is $H_z(f)$, the channel covariance matrix corresponding to the coordinated cell is:

$$R_{zz}(f) = H_z(f)^H H_z(f) = \begin{bmatrix} R'_{11} & R'_{12} & R'_{13} & R'_{14} \\ R'_{21} & R'_{22} & R'_{23} & R'_{24} \\ R'_{31} & R'_{32} & R'_{33} & R'_{34} \\ R'_{41} & R'_{42} & R'_{43} & R'_{44} \end{bmatrix} \quad \text{Formula 11}$$

Wherein, the moduli of elements R'$_{11}$, R'$_{22}$, R'$_{33}$ 和 R'$_{44}$ on the main diagonal in the matrix, which are the powers of CSI-RSs (Channel State Info-Reference Signals) transmitted by four antennae of the coordinated cell, correspond to the signal intensities of the four CSI-RSs (Received Signal Strength Indicator, RSSI).

Likewise, in order to maintain a relatively stable pre-estimation and feedback, the above covariance matrix can be updated continuously by using a sliding averaging way:

$$R_{xx}^{(k+1)} \xleftarrow{k+1} \rho R_{xx}^{(k)} + (1-\rho) \sum_{n=1}^{N_d} H_{x,n}^{(k),H} H_{x,n}^{(k)} \quad \text{Formula 12}$$

That is, $$\rho R_{xx}^{(k)} + (1-\rho) \sum_{n=1}^{N_d} H_{x,n}^{(k),H} H_{x,n}^{(k)}$$

is calculated according to a channel covariance matrix $R_{xx}^{(k)}$ at time k and a channel coefficient vector $H^{(k)}$ at time k, and the calculation result is taken as the channel covariance matrix $R_{xx}^{(k+1)}$ at time k+1, wherein, $N_d$ is the window size of a Fast Fourier Transform when the UE performs the diversity combination; ρ is a set weighing value.

In the method for implementing coordinated multi-point transmission provided by the embodiment of the present invention, the phase differences between the signals of the current service cell and respective other coordinated cells are fed back to corresponding cell base stations by means of limited feedback in order to implement phase compensation of signals at transmitting ends, and the demodulation performance of signals of the user equipment is improved by determining the start point of the window of the FFT when performing diversity combination according to the principle of maximum energy after combining the signals received by the user equipment, and further by combining the signals transmitted by the multiple coordinated cells using the FFT algorithm, thereby effectively eliminating the influence on the receiving-transmitting synchronization by the phase noise caused by the phase differences among multiple coordinated cells.

Furthermore, the present embodiment further provides a method for obtaining parameters such as the signal intensity, phase difference and so on of different coordinated cells by means of a channel covariance matrix/cross-covariance matrix, which simplifies the prior art method of sensing and measuring signal parameters.

Third Embodiment:

With regard to the method provided in the Second Embodiment, the present embodiment provides a user equipment for implementing coordinated multi-point transmission.

Figure 4:
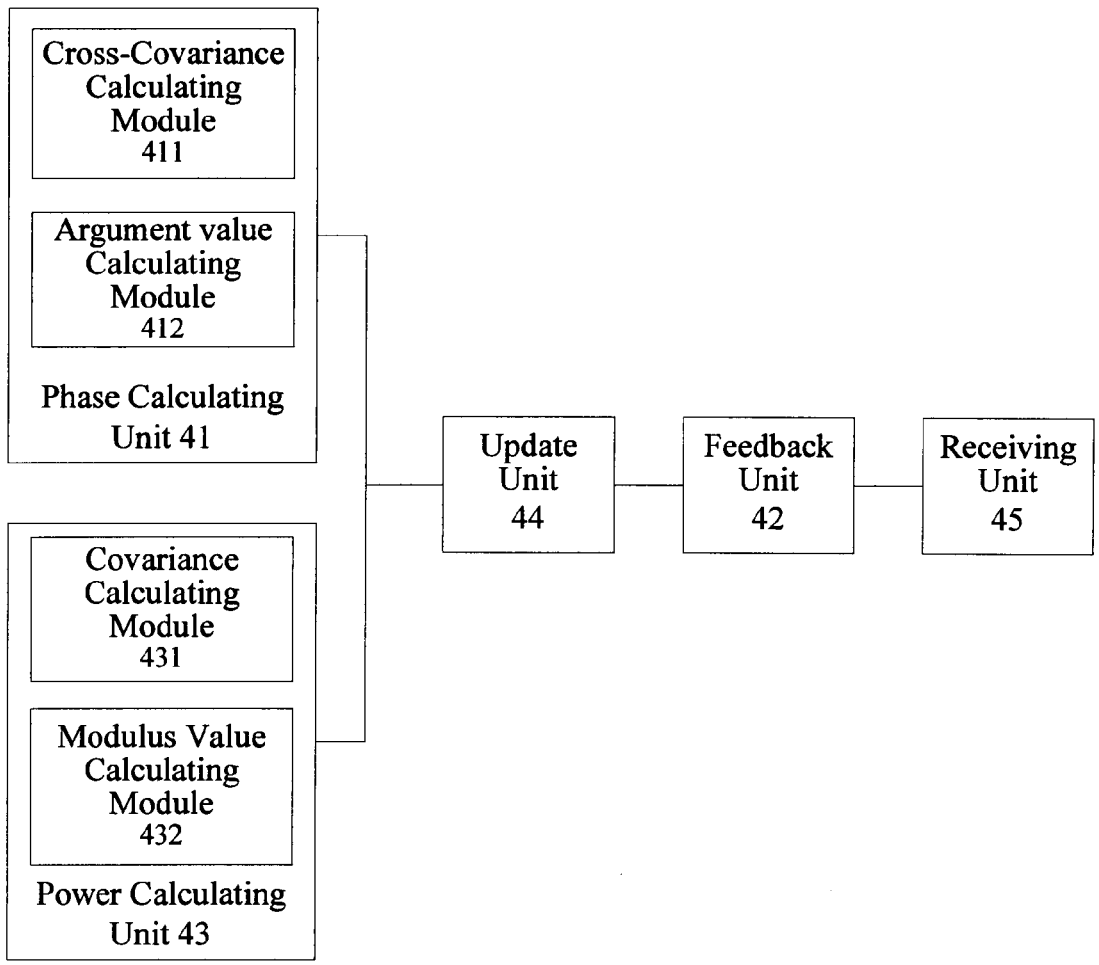
FIG. 4 is a first schematic structure diagram of a user equipment provided in a third embodiment of the present invention.
Figure 5:
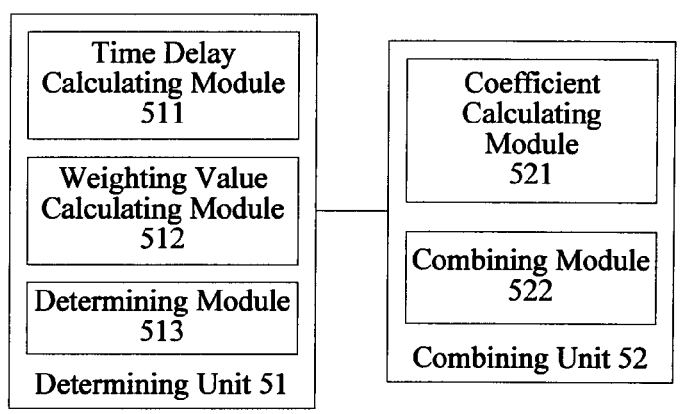
FIG. 5 is a second schematic structure diagram of the user equipment provided in the third embodiment of the present invention.

As shown in FIG. 4, the user equipment provided in the present embodiment comprises:

a phase calculating unit 41, for obtaining phase differences between other coordinated cells and a current service cell by calculating channel cross-covariance matrixes between the current service cell and the other coordinated cells in a coordinated multi-point transmission system; wherein the other coordinated cells are cells among all the coordinated cells other than the current service cell;

a feedback unit 42, for feeding back the phase differences to corresponding base stations of the other coordinated cells, respectively, to implement phase compensation;

a receiving unit 45, for receiving signals transmitted by the base stations of all the coordinated cells after the phase compensation, In the present embodiment, the channel cross-covariance matrixes $R_{xy}(f)$ are the covariance matrixes between channel coefficients of the current service cell and the other coordinated cells, i.e.

$$R_{xy}(f)=H_x(f)^H H_y(f)$$

wherein $H_x(f)$ is the channel coefficient vector of the current service cell; $H_x(f)^H$ is the transposition of $H_x(f)$; and $H_y(f)$ is the channel efficient vector of a cell among the other coordinated cells. Then, the phase calculating unit 41 further comprises:

a cross-covariance calculating module 411, for calculating a channel cross-covariance matrix between the current service cell and the other coordinated cell according to a formula of $$R_{xy}(f)=H_x(f)^H H_y(f);$$

an argument value calculating module 412, for calculating an argument of each element on the main diagonal of $R_{xy}(f)$, wherein values of the arguments are the phase differences of the signals transmitted by multiple antennae of the cell among the other coordinated cells with respect to the current service cell.

Furthermore, the user equipment provided in the present embodiment further comprises:

a power calculating unit 43, for calculating powers of signals transmitted by multiple antennae of each coordinated cell by means of the channel covariance matrix;

and, the channel covariance matrix $R_{xx}(f)$ is the auto-covariance matrix of channel coefficients of a cell among the coordinated cells, i.e.:

$$R_{xx}(f)=H_x(f)^H H_x(f)$$

Wherein, $H_x(f)$ is the channel coefficients of the cell among the coordinated cells; then, the power calculating unit 43 comprises:

a covariance calculating module 431, for calculating the channel cross-covariance matrix of a coordinated cell according to a formula of $R_{xx}(f)=H_x(f)^H H_x(f)$ in turn;

a modulus value calculating module 432, for calculating modulus of each element on the main diagonal in $R_{xx}(f)$, wherein the obtained moduli are powers of signals transmitted by multiple antennae of said coordinated cell.

Furthermore, the user equipment provided in the present embodiment can further comprise: an update unit 44, for modifying the channel covariance matrix or the channel cross-covariance matrix by means of the formula $$R^{(k+1)} \overset{k+1}{\leftarrow} \rho R^{(k)} + (1-\rho)\sum_{n=1}^{N_d} H_n^{(k),H} H_n^{(k)}; \quad \text{Formula 13}$$

i.e. calculating $$\rho R^{(k)} + (1-\rho)\sum_{n=1}^{N_d} H_n^{(k),H} H_n^{(k)}$$

by means of a channel covariance matrix or a channel cross-covariance matrix $R^{(k)}$ at time k and a channel coefficient vector $H^{(k)}$ at time k, thereby obtaining a channel covariance matrix or a channel cross-covariance matrix $R^{(k+1)}$ at time k+1; wherein, $N_d$ is the window size of a Fast Fourier Transform. Specifically, the update unit 44 further comprises:

a first update module, for modifying the channel cross-covariance matrix calculated by the cross-covariance calculating module 411, wherein, the $R^{(k+1)}$ in the above Formula 13 is $R_{xy}$;

a second update module, for modifying the channel covariance matrix calculated by the covariance calculating module 431, wherein, the $R^{(k+1)}$ in the above Formula 13 is $R_{xx}$.

Furthermore, the user equipment provided in the present embodiment further comprises the following structures for accomplishing the procedure of combining the signals transmitted by the multiple coordinated cells; specifically, the user equipment further comprises:

a determining unit 51, for determining the start point of the window of the Fast Fourier Transform according to a principle of maximum combination energy;

a combining unit 52, for combining the signals received after the phase compensation by using a Fast Fourier Transform algorithm.

Here, the determining unit 51 comprises:

a time delay calculating module 511, for calculating the time delay differences of the other coordinated cells with respect to a reference cell, by taking the multiple coordinated cells as the reference cell in turn and taking the time delay of the reference cell with respect to the current service cell as a reference time delay;

a weighting value calculating module 512, for calculating a weighting value for the signals transmitted by each of said coordinated cells when combining, according to the time delay difference of each coordinated cell with respect to the reference cell; and a determining module 513, for obtaining reference energy values corresponding to the multiple reference cells, respectively, by calculating reference energy values after combining the received signals according to the weighting value corresponding to each coordinated cell, and determining, as a first cell, a reference cell corresponding to the maximum value of the multiple reference energy values, wherein the time start point after removing the Cyclic Preamble of the signals of said first cell is the start point of the window of the Fast Fourier Transform.

In the present embodiment, the combining unit 52 comprises:

a coefficient calculating module 521, for obtaining channel coefficients after combining the signals received after the phase compensation, by accomplishing the calculation of the Formula 10 of by using a Fast Fourier Transform algorithm, wherein, M is the number of the coordinated cells, and $\Delta\tau_{m,l}$ is the time delay of the m-th coordinated cell with respect to the first cell;

a combining module 522, for calculating signals after combining according to the channel coefficients after combining.

In the user equipment for implementing coordinated multi-point transmission provided by the embodiment of the present invention, the phase differences between the signals of respective coordinated cells and the current service cell are fed back to corresponding cell base stations by means of limited feedback in order to implement phase compensation of signals at transmitting ends, and the demodulation performance of signals of the user equipment is improved by determining the start point of the window of the FFT when performing diversity combination according to the principle of maximum energy after combining the signals received by the user equipment, and further by combining the signals transmitted by the multiple coordinated cells using the FFT algorithm, thereby effectively eliminating the influence on the receiving-transmitting synchronization by the phase noise caused by the phase differences among multiple coordinated cells.

Furthermore, the user equipment further provided by the present embodiment can further obtain parameters such as the signal intensity, phase difference and so on of different coordinated cells by means of a channel covariance matrix/cross-covariance matrix, which simplifies the prior art procedure of sensing and measuring signal parameters.

Figure 6:
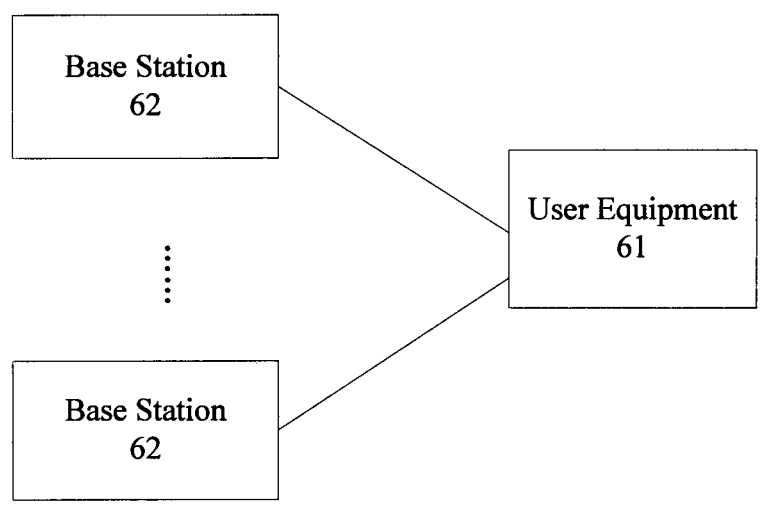
FIG. 6 is a schematic structure diagram of a system provided in a fourth embodiment of the present invention.

Fourth Embodiment:

An embodiment of the present invention further provides a system for implementing coordinated multi-point transmission, which, as shown in FIG. 6, comprises the above user equipment 61 and at least two base stations 62, wherein the at least two base stations 62 belong to at least two coordinated cells in the mode of multi-point transmission, respectively; specifically, the at least two base stations 62 are configured to transmit pilot signals outwards;

the user equipment 61 is configured to detect the pilot signals corresponding to the at least two base stations, respectively, obtain phase differences between other coordinated cells among the at least two coordinated cells and a current service cell by calculating channel cross-covariance matrixes between the current service cell and the other coordinated cells in the coordinated multi-point transmission system, and feed back the phase differences to the at least two base stations 62, in order to implement phase compensation;

the at least two base stations 62 are further configured to implement a phase compensation of signals according to the phase differences fed back by the user equipment, and transmit the signals after the phase compensation at least to the user equipment.

Furthermore, in order to successfully accomplishing the procedure of combining the signals transmitted by the multiple coordinated cells, in the system for implementing coordinated multi-point transmission provided by the present embodiment, the user equipment 61 is further configured to determine the start point of the window of a Fast Fourier Transform according to a principle of maximum combination energy, and combine the signals received after the phase compensation by using the Fast Fourier Transform algorithm.

For the specific working principle of the system for implementing coordinated multi-point transmission provided in the present embodiment, the description of the method in the Second Embodiment can be referred to, and thus it will not be repeated here.

In the system for implementing coordinated multi-point transmission provided by the embodiment of the present invention, the phase differences between other coordinated cells and a current service cell are easily obtained by establishing cross-covariance matrixes between channel coefficients of the current service cell and the other coordinated cells; and the demodulation performance of signals of a user equipment is improved by feeding back the phase differences to the corresponding base stations by means of limited feedback in order to implement phase compensation of signals at transmitting ends, thereby effectively eliminating the influence on the receiving-transmitting synchronization by the phase noise caused by the phase differences among multiple coordinated cells.

Furthermore, the start point of the window of the Fast Fourier Transform is determined according to the principle of maximum energy after combining the signals received by the user equipment, and the received signals are combined using the Fast Fourier Transform algorithm, so as to not only maximize the combination energy and also reduce the processing time for signal combination, thereby improving the efficiency of operating.

The method, equipment and system for implementing coordinated multi-point transmission provided in the embodiments of the present invention can be applied to the network MIMO (Multi-Input Multi-Output) in the Wimax (Worldwide Interoperability for Microwave Access) system, the wireless ad-hoc network, the wireless sensor network or the coordinated communication in the wireless Mesh network, etc., and it can also be applied to the fields of wireless ranging, radar interference source location and so on.

Through the description of the embodiment above, it will be clear to a person skilled in the art that the present invention can be carried out by way of software plus necessary hardware platform, and of course can be carried out all by hardware. Based on such an understanding, all or part of the contribution of the solution of the present invention over the background art can be embodied at a form of software product, and the computer software product can be stored in a storage medium, such as a ROM/RAM, a magnetic disk, an optical disk and so on, which includes several instructions for enabling a computer device (which can be a personal computer, a server, or a network device, etc.) to implement the method(s) described in the respective embodiments or some parts of the embodiments of the present invention.

What is claimed is:

1. A method for implementing coordinated multi-point transmission, comprising:

obtaining phase differences between other coordinated cells and a current service cell by calculating channel cross-covariance matrixes between the current service cell and the other coordinated cells;

feeding back the phase differences to corresponding base stations of the other coordinated cells, respectively, to implement phase compensation;

receiving signals transmitted by the base stations of the coordinated cells after the phase compensation;

wherein the other coordinated cells are cells among all coordinated cells other than the current service cell; the channel cross-covariance matrixes between the current service cell and the other coordinated cells are covariance matrixes between channel coefficients of the current service cell and the other coordinated cells.

2. The method for implementing coordinated multi-point transmission according to claim 1, wherein the covariance matrix between channel coefficients of the current service cell and the other coordinated cell is:

$$R_{xy}(f)=H_x(f)^H H_y(f)$$

wherein $H_x(f)$ is the channel coefficient vector of the current service cell; $H_x(f)^H$ is the transposition of $H_x(f)$; and $H_y(f)$ is the channel efficient vector of a cell among the other coordinated cells.

3. The method for implementing coordinated multi-point transmission according to claim 2, wherein the obtaining phase differences between the current service cell and other coordinated cells by calculating channel cross-covariance matrixes between the current service cell and the other coordinated cells comprises:

calculating the channel cross-covariance matrix between the current service cell and the other coordinated cell according to a formula of $R_{xy}(f)=H_x(f)^H H_y(f)$;

calculating an argument of each element on the main diagonal of $R_{xy}(f)$, wherein values of the arguments are the phase differences of the signals transmitted by multiple antennae of the cell among the other coordinated cells with respect to the current service cell.

4. The method for implementing coordinated multi-point transmission according to claim 3, wherein it further comprises:

calculating $$\rho R^{(k)} + (1-\rho)\sum_{n=1}^{N_d} H_n^{(k),H} H_n^{(k)}$$

according to a channel covariance matrix or a channel cross-covariance matrix $R^{(k)}$ at time k and a channel coefficient vector $H^{(k)}$ at time k, and taking it as a channel covariance matrix or a channel cross-covariance matrix $R^{(k+1)}$ at time k+1;

wherein, $N_d$ is the window size of a Fast Fourier Transform.

5. The method for implementing coordinated multi-point transmission according to claim 1, wherein it further comprises:

obtaining powers of signals transmitted by multiple antennae of each of the coordinated cells by calculating the channel covariance matrix of each of said coordinated cells;

wherein the channel covariance matrix of each of the coordinated cells is auto-covariance matrix of channel coefficients of each cell in the coordinated cells.

6. The method for implementing coordinated multi-point transmission according to claim 5, wherein the auto-covariance matrix of channel coefficient of a cell among the coordinated cells is: $R_{xx}(f)=H_x(f)^H H_x(f)$; wherein $H_x(f)$ is the channel coefficient vector of the cell among the coordinated cells; and then said obtaining powers of signals transmitted by multiple antennae of each of said coordinated cells by calculating the channel covariance matrix of each of said coordinated cells comprises:

calculating the channel covariance matrix of each of said coordinated cells according to a formula of $R_{xx}(f)=H_x(f)^H H_x(f)$ in turn;

calculating a modulus of each element on the main diagonal in each $R_{xx}(f)$, wherein the obtained moduli are powers of signals transmitted by multiple antennae of the coordinated cell.

7. The method for implementing coordinated multi-point transmission according to claim 1, wherein it further comprises:

determining the start point of the window of a Fast Fourier Transform according to a principle of maximum combination energy; and combining the signals received after the phase compensation by using a Fast Fourier Transform algorithm.

8. The method for implementing coordinated multi-point transmission according to claim 7, wherein said determining the start point of the window of a Fast Fourier Transform according to a principle of maximum combination energy comprises:

calculating the time delay differences of the other coordinated cells with respect to a reference cell, by taking the multiple coordinated cells as the reference cell in turn and taking the time delay of the reference cell with respect to the current service cell as a reference time delay;

calculating a weighting value for the signals transmitted by each of said coordinated cells when combining; and obtaining reference energy values corresponding to the multiple reference cells, respectively, by calculating reference energy values after combining the received signals according to the weighting value corresponding to each coordinated cell, and determining, as a first cell, a reference cell corresponding to the maximum value of the multiple reference energy values, wherein the time start point after removing a Cyclic Preamble of the signals of said first cell is the start point of the window of the Fast Fourier Transform.

9. The method for implementing coordinated multi-point transmission according to claim 8, wherein if the time delay difference of a coordinated cell with respect to the reference cell is $\tau$, then the weighting value of the signals transmitted by said coordinated cell when combining is $$c(\tau) = \begin{cases} 0 & \tau < -T_u \\ \dfrac{T_u+\tau}{T_u} & -T_u < \tau < 0 \\ 1 & 0 < \tau < T_{CP} \\ \dfrac{\tau - T_{CP}}{T_u} & T_{CP} < \tau < T_{CP}+T_u \\ 0 & T_{CP}+T_u < \tau \end{cases}$$

wherein $T_u$ is the width of an orthogonal frequency division multiplexing symbol, and $T_{CP}$ is the length of a Cyclic Preamble.

10. The method for implementing coordinated multi-point transmission according to claim 7, wherein said combining the signals received after the phase compensation by using a Fast Fourier Transform algorithm is specifically:

obtaining channel coefficients after combining the signals received after the phase compensation, by accomplishing the calculation of a formula of $$H(f) = \sum_{m=1}^{M} H_m(f) \cdot e^{-j2\pi f \Delta \tau_{m,1}}$$

by using the Fast Fourier Transform algorithm;
calculating signals after the combining according to the channel coefficients after the combining;
wherein, M is the number of the coordinated cells, and $\Delta \tau_{m,l}$ is the time delay of the m-th coordinated cell with respect to the first cell.

11. A user equipment, comprising:
a processor configured to:
obtain phase differences between a current service cell and other coordinated cells by calculating channel cross-covariance matrixes between the current service cell and the other coordinated cells;
feed back the phase differences to corresponding base stations of the other coordinated cells, respectively, to implement phase compensation;
receive signals transmitted by the base stations of the other coordinated cells after the phase compensation; and
update the channel cross-covariance matrixes according to a sliding average,
wherein the sliding average is calculated based at least in part on a channel cross-covariance matrix $R^{(k)}$ at time k and a channel coefficient vector $H^{(k)}$ at time k, and a result of the calculation is taken as a channel cross-covariance matrix $R^{(k+1)}$ at time k+1,
wherein the other coordinated cells are cells among all the coordinated cells other than the current service cell, and
wherein the channel cross-covariance matrixes between the current service cell and the other coordinated cells are covariance matrixes between channel coefficients of the current service cell and the other coordinated cells.

12. The user equipment according to claim 11, wherein the covariance matrixes between channel coefficients of the current service cell and the other coordinated cells comprise:

$R_{xy}(f)=H_x(f)^H H_y(f)$, wherein $H_x(f)$ is a channel coefficient vector of the current service cell,
wherein $H_x(f)^H$ is a transposition of $H_x(f)$,
wherein $H_y(f)$ is a channel coefficient vector of a cell among the other coordinated cells, and
wherein the processor is further configured to:
calculate a channel cross-covariance matrix between the current service cell and the other coordinated cells according to a formula of $R_{xy}(f)=H_x(f)^H H_y(f)$; and
calculate an argument of each element on a main diagonal of Rxy(f),
wherein values of the arguments are the phase differences of the signals transmitted by multiple antennae of the cell among the other coordinated cells with respect to the current service cell.

13. The user equipment according to claim 12, wherein the processor is configured to calculate the sliding average using a formula:

$$\rho R^{(k)} + (1-\rho) \sum_{n=1}^{N_d} H_n^{(k),H} H_n^{(k)},$$

wherein ρ is a set weighting value, wherein $R^{(k)}$ is the channel cross-covariance matrix at time k,
wherein $H^{(k)}$ is the channel coefficient vector at time k, and
wherein $N_d$ is a window size of a Fast Fourier Transform.

14. The user equipment according to claim 11, wherein the processor is further configured to:
obtain powers of signals transmitted by multiple antennae of each of said other coordinated cells by calculating the channel covariance matrix of each of said other coordinated cells, and wherein the channel covariance matrix of each of said other coordinated cells is the auto-covariance matrix of channel coefficients of each cell among the other coordinated cells.

15. The user equipment according to claim 14, wherein the auto-covariance matrix of channel coefficients of a cell among the other coordinated cells comprises:

$R_{xx}(f)=H_x(f)^H H_x(f)$, wherein $H_x(f)$ is aannel coefficient vector of the cell among the other coordinated cells, and
wherein the processor is further configured to:
calculate the channel cross-covariance matrix of each of said other coordinated cells according to a formula of $R_{xx}(f)=H_x(f)^H H_x(f)$ in turn; and
calculate a modulus of each element on a main diagonal in each Rxx(f),
wherein the obtained moduli are powers of signals transmitted by multiple antennae of the other coordinated cells.

16. The user equipment according to claim 11, wherein the processor is further configured to:
determine a start point of a window of a Fast Fourier Transform according to a principle of maximum combination energy; and
combine the signals received after the phase compensation by using a Fast Fourier Transform algorithm.

17. The user equipment according to claim 16, wherein the processor is further configured to:
calculate time delay differences of the other coordinated cells with respect to a reference cell by taking multiple coordinated cells as the reference cell in turn and taking the time delay of the reference cell with respect to the current service cell as a reference time delay;
calculate a weighting value for the signals transmitted by each of said other coordinated cells when combining according to the time delay difference of each coordinated cell with respect to the reference cell; and
obtain reference energy values corresponding to the multiple reference cells, respectively, by calculating reference energy values after combining the received signals according to the weighting value corresponding to each coordinated cell, and determining, as a first cell, a reference cell corresponding to a maximum value of the multiple reference energy values, wherein a time start point after removing a Cyclic Preamble of the signals of said first cell is the start point of the window of the Fast Fourier Transform.

18. The user equipment according to claim 16, wherein the processor is further configured to:
obtain channel coefficients after combining the signals received after the phase compensation by accomplishing a calculation of a formula of $$H(f) = \sum_{m=1}^{M} H_m(f) \cdot e^{-j2\pi f \Delta \tau_{m,1}}$$

by using a Fast Fourier Transform algorithm, wherein M is a number of the other coordinated cells, and wherein $\Delta T_{m,l}$ is a time delay of an m-th coordinated cell with respect to the first cell; and calculate signals after the combining according to the channel coefficients after the combining.

19. A system for implementing coordinated multi-point transmission, comprising a user equipment and at least two base stations, wherein the at least two base stations belong to at least two coordinated cells in the mode of multi-point transmission, respectively, wherein the at least two base stations are configured to transmit pilot signals outwards;

the user equipment is configured to detect the pilot signals corresponding to the at least two base stations, respectively, obtain phase differences between other coordinated cells among the at least two coordinated cells and a current service cell by calculating channel cross-covariance matrixes between the current service cell and the other coordinated cells, and feed back the phase differences to the at least two base stations, in order to implement phase compensation;

the at least two base stations are further configured to implement the phase compensation of signals according to the phase differences fed back by the user equipment, and transmit the signals after the phase compensation at least to the user equipment.

20. The system for implementing coordinated multi-point transmission according to claim 19, wherein the user equipment is further configured to determine the start point of the window of a Fast Fourier Transform according to a principle of maximum combination energy, and combine the signals received after the phase compensation by using a Fast Fourier Transform algorithm.

* * * * *

UNITED STATES PATENT AND TRADEMARK OFFICE
CERTIFICATE OF CORRECTION

PATENT NO. : 8,599,810 B2
APPLICATION NO. : 13/338358
DATED : December 3, 2013
INVENTOR(S) : Guolin Sun et al.

It is certified that error appears in the above-identified patent and that said Letters Patent is hereby corrected as shown below:

Title Page, Item (75) Inventors, should read: Guolin Sun, Kista (SE); Feng Ye, Chengdu (CN); Xiujuan Gao, Chengdu (CN)

Title Page 2, Item (56) References Cited, under Other Publications, the following cited art should read:

"International Search Report for International Application No. PCT/CN2010078713, mailed Jan. 20, 2011, Huawei Technologies Co., Ltd.

Koivisto, Tommi, et al.; Impact of time and frequency offsets on cooperative multi-user MIMO-OFDM systems; IEEE 978-1-4244-5213; Apr. 2009 (5 pgs.).

Sun, Guolin, et al.; A FFT-window search algorithm for diversity combining in downlink multipoint joint transmission; Huawei Technologies Co., Ltd., IEEE 978-1-4244-5849; Mar. 2010 (5 pgs.)."

In the Claims

Claim 1, Column 12/Line 67 should read: "coordinated cells after the phase compensation,"

Claim 4, Column 13/Line 46 should read: "k+1,"

Claim 5, Column 13/Line 54 should read: "cells,"

Claim 6, Column 13/Line 60 should read: "ance matrix of the channel coefficient of a cell among the coor-"

Claim 6, Column 14/Line 3 - add "and" after the ";"

Claim 11, Column 15/Line 8 should read: "channel coefficients after the combining,"

Claim 14, Column 16/Line 11 should read: "nated cells, wherein the channel covariance matrix"

Signed and Sealed this
Eighteenth Day of March, 2014

Michelle K. Lee
*Deputy Director of the United States Patent and Trademark Office*

CERTIFICATE OF CORRECTION (continued)
U.S. Pat. No. 8,599,810 B2

Claim 15, Column 16/Line 21 should read: "wherein Hx(f) is a channel coefficient vector of the cell among"